(12) United States Patent
Luo et al.

(10) Patent No.: US 7,978,770 B2
(45) Date of Patent: Jul. 12, 2011

(54) METHOD AND APPARATUS FOR MOTION VECTOR PREDICTION IN TEMPORAL VIDEO COMPRESSION

(75) Inventors: Dexiang (Edward) Luo, San Diego, CA (US); Fang Shi, San Diego, CA (US); Seyfullah Halit Oguz, San Diego, CA (US); Vijayalakshmi R. Raveendran, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1535 days.

(21) Appl. No.: 11/186,126

(22) Filed: Jul. 20, 2005

(65) Prior Publication Data

US 2006/0018381 A1    Jan. 26, 2006

Related U.S. Application Data

(60) Provisional application No. 60/589,818, filed on Jul. 20, 2004.

(51) Int. Cl.
    *H04N 7/12*    (2006.01)
(52) U.S. Cl. .......... 375/240.16; 375/240.12; 375/240.21
(58) Field of Classification Search ............ 375/240.16, 375/240.12, 240.21
    See application file for complete search history.

(56) References Cited

U.S. PATENT DOCUMENTS

| | | | | |
|---|---|---|---|---|
| 6,160,917 A | * | 12/2000 | Sommer | 382/236 |
| 6,483,928 B1 | * | 11/2002 | Bagni et al. | 382/107 |
| 6,931,064 B2 | * | 8/2005 | Mori et al. | 375/240.16 |
| 7,173,971 B2 | * | 2/2007 | Amara et al. | 375/240.27 |
| 2005/0163218 A1 | | 7/2005 | Le Clerc et al. | |
| 2005/0286777 A1 | * | 12/2005 | Kumar et al. | 382/232 |

FOREIGN PATENT DOCUMENTS

JP    2003219423    7/2003

OTHER PUBLICATIONS

Boroczky, Lille et al., "Advanced Spatiotemporal Propagation Strategy for Multiresolution Motion Estimation," Signal Processing VII: Theories and Applications, Proceedings of EUSIPCO, vol. 2, Sep. 13, 1994, pp. 680-683, XP001028069.
Iwata, Eiji et al., "An LSI Architecture for Block-Matching Motion Estimation Algorithm Considering Chrominance Signal," VLSI Signal Processing, VIII, 1995, IEEE Signal Processing Society Workshop on Sakai, Japan, Sep. 16-18, 1995, pp. 421-430.

(Continued)

*Primary Examiner* — Tung Vo
*Assistant Examiner* — Anner Holder
(74) *Attorney, Agent, or Firm* — Kevin T. Cheatham

(57) ABSTRACT

A method for motion vector prediction for a current block, the current block having a set of neighboring blocks that includes blocks that do not have an associated motion vector, is disclosed. The method including deriving a candidate motion vector for each block in the set of neighboring blocks that does not have an associated motion vector; and using the candidate motion vector for each block in the set of neighboring blocks that does not have the associated motion vector to predict a current motion vector for the current block. An apparatus for performing the method is also disclosed.

24 Claims, 12 Drawing Sheets

(a) SMOOTH REGION (b) OUTLIER MV (c) OBJECT EDGE

OTHER PUBLICATIONS

Ramkishor, K. et al., "Spatio-temporal Correlation Based Fast Motion Estimation Algorithm for MPEG-2," Institute of Electrical and Electronic Engineers, Conference Record of the 35th Asilomar Conference on Signals, Systems & Computers, Pacific Grove, CA, Nov. 4-7, 2001, pp. 220-224.

Wong, Carol W., "Motion-Compensated Video Image Compression Using Luminance and Chrominance Components for Motion Estimation," Data Compression Conference, Apr. 8-11, 1991, Snowbird, UT, IEEE Comput. Soc., p. 440.

Zhihang, Zheng et al., "A Novel Method of Motion Estimation Using Luminance and Chrominance Blocks," Speech, Image Processing and Neural Networks, 1994 International Symposium on Hong Kong, Apr. 13-16, 1994, pp. 361-364.

International Search Report and Written Opinion—PCT/US2005/025812, International Search Authority—European Patent Office—Jun. 4, 2006.

* cited by examiner

| D 110 | B (causal MV) 106 | C (causal MV) 108 |
|---|---|---|
| A (causal MV) 104 | Current 102 | |

100

PRIOR ART

FIG. 1

| A (causal MV) 504 | B (causal MV) 506 | C (causal MV) 508 |
| --- | --- | --- |
| H (causal MV) 510 | Current 502 | D (from coarser MV) 512 |
| G (from coarser MV) 514 | F (from coarser MV) 516 | E (from coarser MV) 518 |

METHOD AND APPARATUS FOR MOTION VECTOR PREDICTION IN TEMPORAL VIDEO COMPRESSION

CLAIM OF PRIORITY UNDER 35 U.S.C. §119

The present Application for Patent claims priority to Provisional Application No. 60/589,818 entitled "Method and Apparatus for Motion Vector Prediction in Temporal Video Compression" filed Jul. 20, 2004 and assigned to the assignee hereof and hereby expressly incorporated by reference herein.

BACKGROUND

Field

The present invention relates generally to video compression, and more particularly, to a method and apparatus motion vector prediction in temporal video compression.

Motion estimation is a critical feature in video coding systems where temporal redundancy in video sequence is exploited. Motion estimation is the process of estimating the current macroblock (or block) in the frame to be predicted based on a block in a previously decoded frame. Generally, the process involves searching the predicted frame for a block that matches the current block based on a measure to minimize distortion. For example, measures that are currently used include sum of absolute differences (SAD) and sum of squared differences (SSD). Typically, the search commences based on an initial guesstimate (location in reference frame) derived using motion vector prediction.

Where a video codec incorporates multiple reference frames and multiple macro-block types in motion vector prediction, the motion vector prediction process introduces very extensive computation. Experiments have shown that the motion estimation can consume 60% (one reference frame) to 90% (five reference frames) of the total encoding time. To reduce the computation complexity in motion estimation while keeping the rate-distortion is a challenging topic. Currently, the related research is focused on obtaining more accurate motion vector predictors and applying early termination by detecting zero blocks in order to reduce processing time or even skip the pixel search step. The accuracy of the predicted motion vector is critical in controlling the total motion estimation time. In the standard for motion vector prediction in the H.264 video codec as proposed by the Joint Video Team (JVT) of ISO/IEC MPEG & ITU-T VCEG (ISO/IEC JTC1/SC29/WG11 and ITU-T SG16 Q.6), JVT-I050, 9TH Meeting, September 2003 (JVT standard), various methods are used to improve the prediction of the motion vectors by introducing more motion vector candidates.

For example, as shown in FIG. 1, the adjacent blocks on the left, top, and top-right of a current block 102 are used to predict the motion vector of the current block:

$$pred\_mv = \mathrm{median}(mv\_A, mv\_B, mv\_C)$$

where the pred_mv is defined as the median predictor, and mv_A, mv_B, mv_C are motion vectors for blocks A 104, B 106, C 108, respectively. To better utilize the motion relationship between the seven inter-prediction modes, one proposal applies a hierarchically search order from mode 1 to 7 rather than the proposed search order in the JVT standard. The motion vector of an upper-layer of the current block that is regarded as a candidate to predict the motion vector of the current block is shown in FIG. 2. Other proposals use more motion vector candidates in the temporal sequences by considering the motion vectors of the corresponding neighboring blocks and all the reference frames. As illustrated in FIG. 3 and FIG. 4, the corresponding motion vectors of the previous and other reference frames are used as the prediction candidates as well. It should be noted that in the multiple reference frame model in FIG. 4, a motion vector in a reference frame is scaled according to its temporal distance from the current frame.

The precision of the motion vector prediction plays a critical role in controlling computational reduction steps such as early termination, fast search method, and fast mode decision (e. g., skip mode) in motion estimation.

SUMMARY

The embodiments described herein provide four approaches for motion vector prediction and schemes to incorporate these approaches to achieve an improved performance in a rate-distortion sense. The methods and apparatus described herein improve the accuracy of motion vector prediction. In one embodiment, the motion vectors of all non-causal blocks of the current block are incorporated in calculating the motion vector predictor by utilizing a more spatial correlation information from the lower resolution version of the original video frame. In another embodiment, chrominance components are integrated with the luminance component to predict more accurate motion vector by using the color information. In yet another embodiment, the system takes into account motion vector information that may be present in a MPEG-2 metadata stream in a video stream transmission system. In still yet another embodiment, a motion vector processing technique is applied to eliminate (i.e., smooth) false motion vectors to improve the accuracy of the technique.

Other objects, features and advantages will become apparent to those skilled in the art from the following detailed description. It is to be understood, however, that the detailed description and specific examples, while indicating preferred embodiments, are given by way of illustration and not limitation. Many changes and modifications within the scope of the embodiments may be made without departing from the spirit thereof, and should include all such modifications.

BRIEF DESCRIPTION OF THE DRAWINGS

The invention may be more readily understood by referring to the accompanying drawings in which:

FIG. 1 illustrates a prior art motion vector prediction scheme using certain adjacent blocks;

FIG. 5 illustrates non-causal reference block locations for prediction of motion vectors;

Like numerals refer to like elements in the figures.

DETAILED DESCRIPTION OF THE PREFERRED EMBODIMENTS

The precision of the motion vector prediction plays a key role in controlling the following computation reduction steps like early termination, fast search method, and fast mode decision (e. g. skip mode). The method proposes four new methods to improve the creation of motion svector in video codec. In one embodiment, utilizing the spatial correlation between macroblocks, a video frame is first downsampled to create a lower resolution version video frame and motion estimation is performed on this lower resolution video frame. Hence a set of motion vectors, referred to as "coarser" motion vectors, are obtained. The coarser motion vectors are mapped to the original video frame. Thus, the motion vectors of all neighboring blocks, including the coarser motion vector (derived from the lower resolution video frames) and the causal motion vectors can be utilized as motion vector candidates. In another embodiment, the metadata information fed to the video codec from the upstream MPEG-2 encoder, which contains the MPEG-2 motion vector information for each macroblock that can be used in predicting the motion vector of the corresponding block, is used. In yet another embodiment, the luminance components are incorporated into calculating the motion vector to fully exploiting the color information. In still yet another embodiment, a motion vector smoothing technique is applied to attempt to correct wrongly predicted motion vectors and remove noise.

1. Non-causal Motion Vectors

Figure 2:
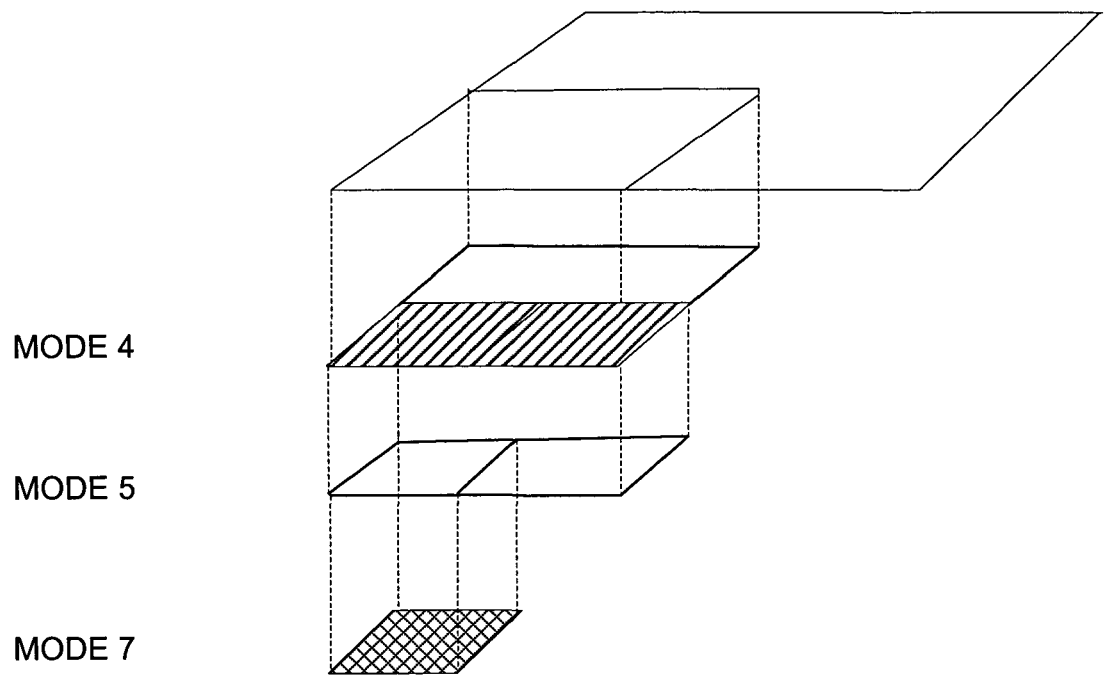
FIG. 2 illustrates a motion vector prediction scheme using a hierarchical search scheme.
Figure 3:
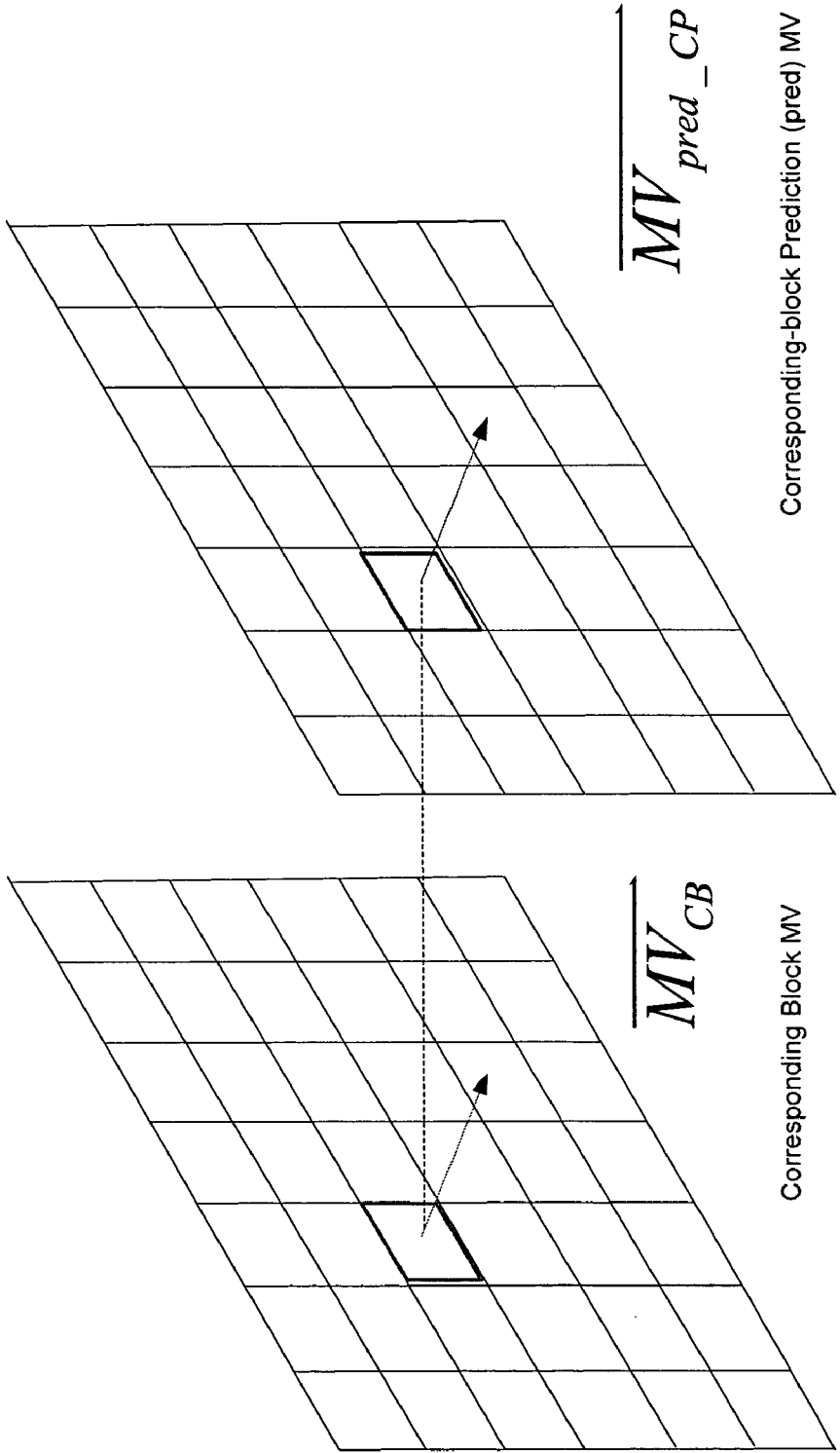
FIG. 3 illustrates a motion vector prediction scheme using a motion vector from a previous reference frame.
Figure 4:
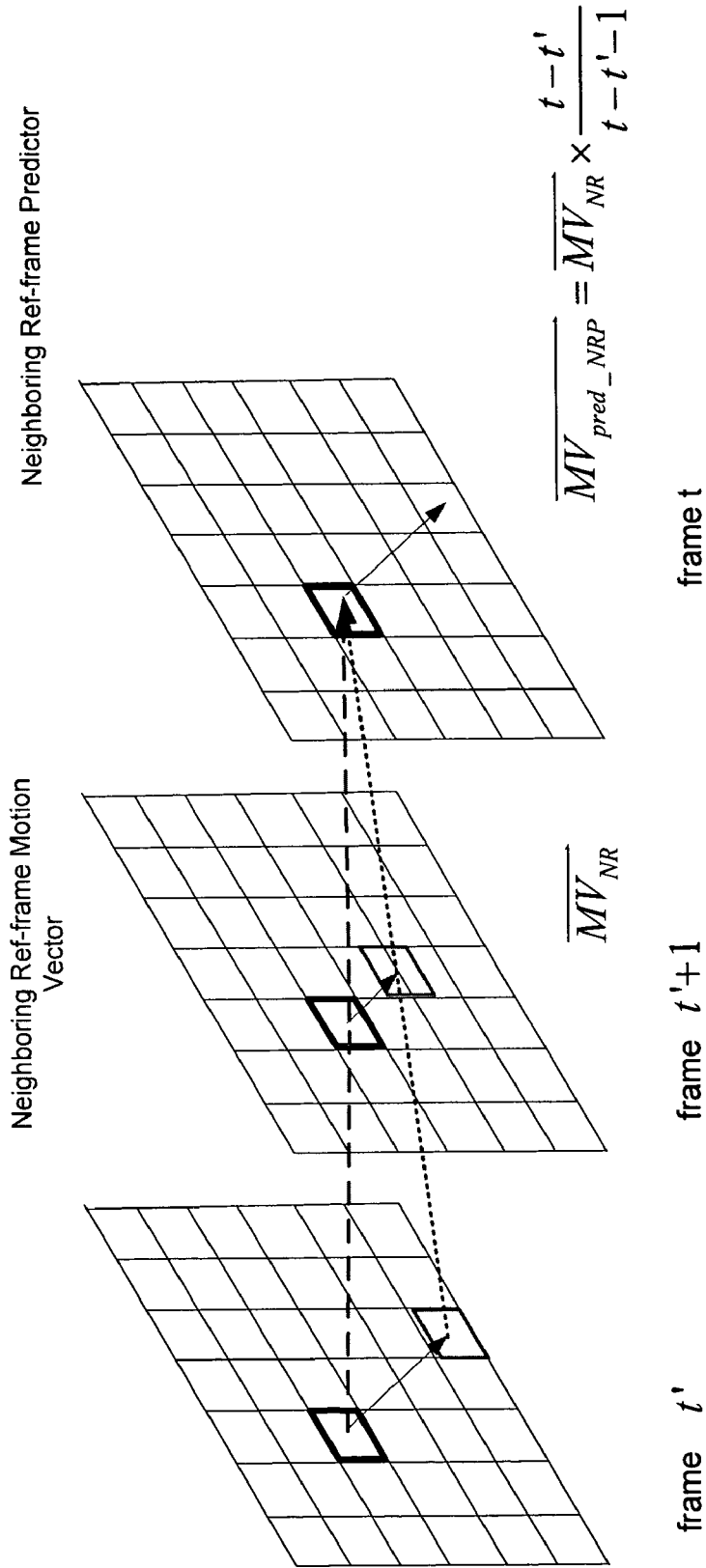
FIG. 4 illustrates a motion vector prediction scheme using a motion vector from a previous reference frame.
Figure 6:
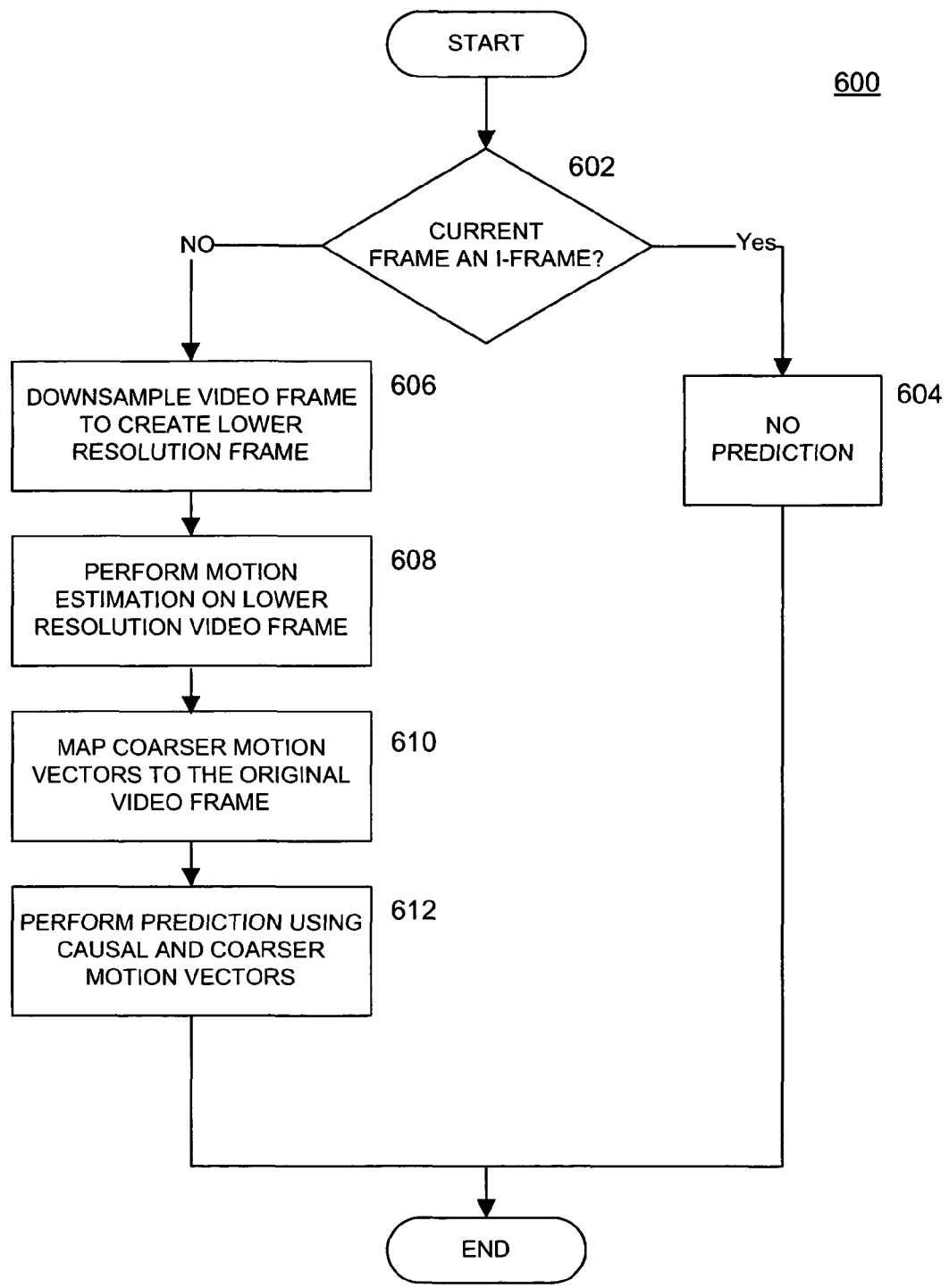
FIG. 6 is a flow diagram illustrating the use of non-causal reference blocks for prediction of motion vectors.
Figure 7:
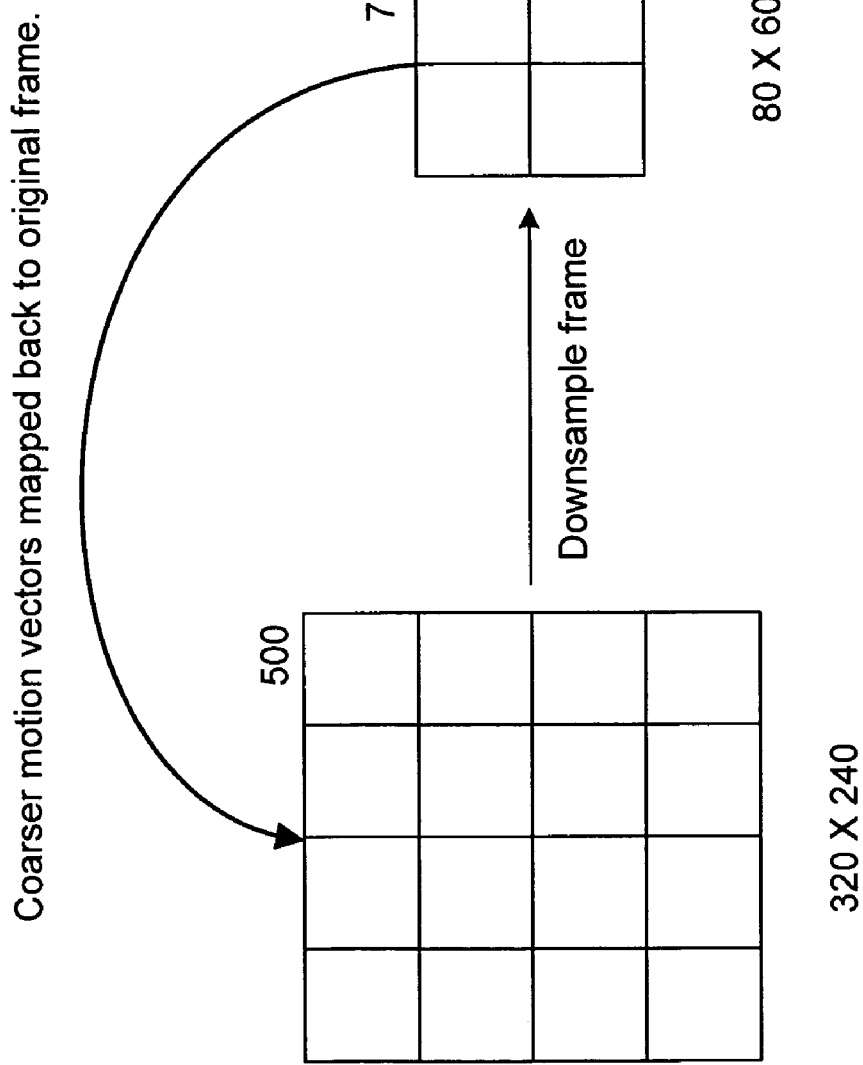
FIG. 7 is a diagram illustrating the creation of coarser motion vectors: from a downsampled video frame.

FIG. 5 illustrates the use of non-causal motion vectors to predict the motion vector of a current block 502 of a current frame 500 in a prediction process 600 as shown in the flow diagram of FIG. 6. In contrast to the JVT standard, as noted previously, where only 3 causal blocks are used in the prediction, in one embodiment all of the blocks 504-518 neighboring to current block 502 may be used as candidates for motion vector prediction for all frames in a frame sequence other than where the frame is an intra frame (I frame), as shown in step 602 and step 604. No prediction is performed for I frames because no motion vector prediction is needed for these types of frames. However, for all other frames, motion vectors for all neighboring blocks are made available through the creation of "coarser" motion vectors, as described in the steps below. Thus, when the video frame is not an I frame, the video frame is downsampled to create a lower resolution frame 702, where it is determined if causal motion vectors are available. Referring to FIG. 5 as an example, casual motion vectors are only available for block 504 (A), block 506 (B), and block 508 (C) and block 510 (H) because block 512 (D), block 518 (E), block 516 (F) and block 514 (G) have not yet been processed pursuant to the scanning order. Thus, operation will continue with step 608, where video frame 500 is downsampled to create lower resolution frame 702, as shown in FIG. 7. Then, motion estimation is performed on lower resolution video frame 702, in step 608, to derive a set of motion vectors, referred to as a set of "coarser" motion vectors, which is then mapped back to the original video frame in step 610 and illustrated in FIG. 7.

Thus, motion vector prediction may be performed in step 612, even when causal motion vectors are not available as the coarser motion vectors may be used. For example, referring to FIG. 6, in one embodiment the prediction for current block 502 is performed using the pattern in the current standard for the causal motion vectors, where only block 510 (H), block 506 (B), and block 508 (C) are used for the prediction, but additional vectors as derived from the non-causal blocks (i.e., the coarser motion vectors from ) are also used. Specifically, the values set for the three motion vectors for block 510 (H), block 506 (B), and block 508 (C) are determined as follows:

1. If H is not available (lies outside of the picture), its MV is set to (0, 0).
2. If C is not available, its Mv is set to A.
3. If both B and C are not available, both Mvs are set to (0, 0).

These motion vectors are combined with the coarser motion vectors from block 512 (D), block 518 (E), block 516 (F) and block 514 (G) for the median predictor.

In another embodiment, the reference blocks used will include all blocks (i.e., block 504 (A), block 506 (B), block 508 (C), block 512 (D), block 518 (E), block 516 (F) and block 514 (G), and block 510 (H)). Then, the median predictor is calculated as:

$$pred\_mv = \text{median}(mv\_A, mv\_B, mv\_C, mv\_D, mv\_E, mv\_F, mv\_G, mv\_H, mv\_PrevCurrent)$$

where mv_PrevCurrent is defined as the motion vector of the corresponding block in the previous reference frame.

2. Motion Vector Information from the Metadata of an MPEG-2 Up Stream

Figure 8:
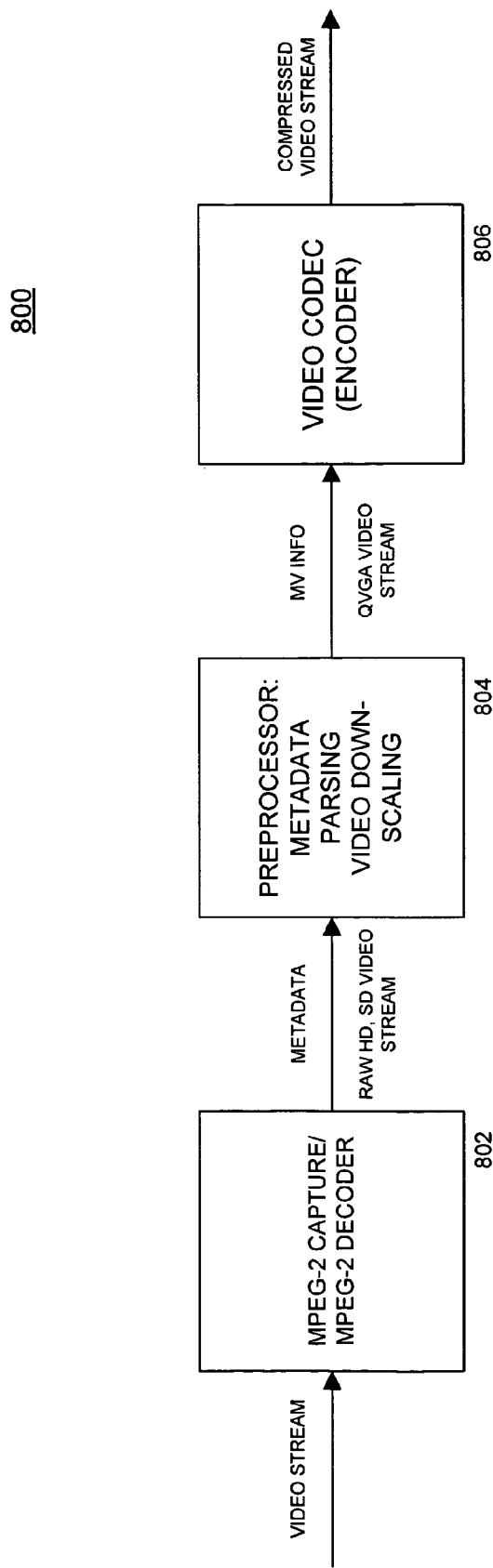
FIG. 8 illustrates a dataflow in a video transmission system.

FIG. 8 illustrates a dataflow of a video transmission system 800, where the video data source fed into a video codec 806 is transmitted from a decoded MPEG-2 video stream from a MPEG-2 decoder 802. In one embodiment, all original source video data is transmitted as a MPEG-2 stream and then decoded. The decoded raw video data is further processed and down-scaled to a quarter VGA (QVGA) size by a preprocessor 804 and presented to video codec 806 for encoding into a new format, such as H.264. Video codec 806 also receives such MPEG-2 metadata as frame size, frame rate, macroblock type and a motion vector of each macroblock. The MPEG-2 motion vectors are thus used by video codec 806 in one embodiment as a motion vector prediction candidate of the corresponding macroblock during the encoding process. In one embodiment, where the size of the macroblock is a block size of 16×16, the MPEG-2 motion vector is also regarded as the up-layer motion vector for all sub-layer blocks.

Figure 9:
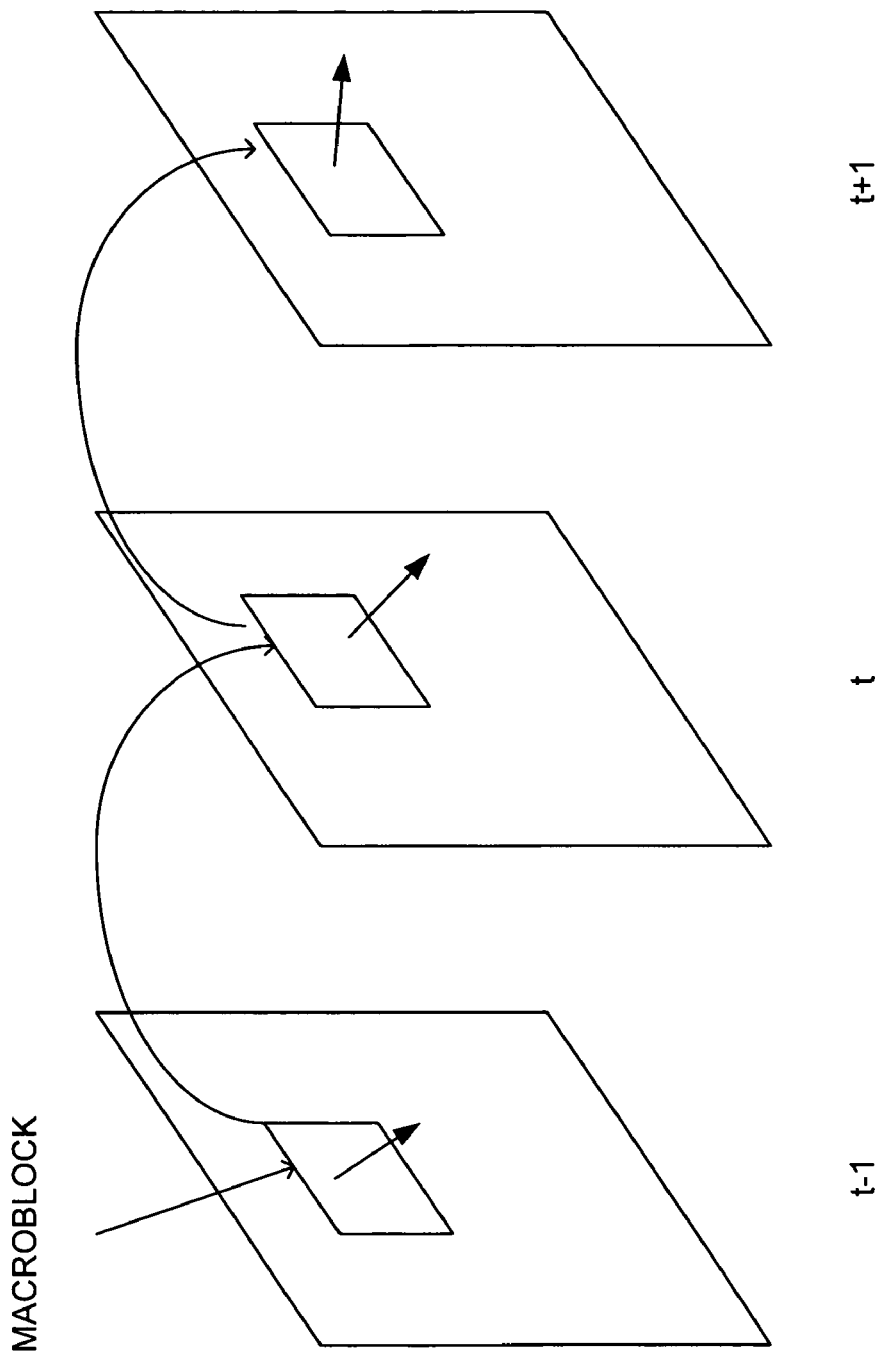
FIG. 9 illustrates the use of metadata to predict a motion vector of a corresponding block in a next frame.

In one embodiment, the concept of using the metadata from a previous format to a new format applies only to transcoding scenarios where coding parameters and side information from input format decoding is utilizable in a target encoder such as video codec 806. Further, as the motion vector is predicted from the previous frame for both P and B frames, it is only appropriate to predict the motion vector from the metadata for an immediately sequential future frame. As shown in FIG. 9, the motion vector in sequence at time t-1 is only used to predict the motion vector of the corresponding block sequence at time t. In one embodiment, the reference frame number of the current frame is used to locate the motion vector associated with the metadata of the previous reference frame.

3. Color Motion Estimation

In current video codec standards such as MPEG-4 and H.264, the motion vector of both chrominance components (Cb and Cr) are derived from corresponding luminance component (Y). The chrominance components are then omitted in rate-distortion (RD) and motion vector prediction processes due to the assumption that the luminance component can provide sufficient information and no additional overhead is required to predict the chrominance. However, for video sequences that have low luminance or detailed color information, the chrominance components are useful for more accurate motion vector prediction. Thus, in one embodiment, the motion estimation uses the luminance component and both chrominance components. For example, when the chroma information is taken out in a video frame that has objects with rich color information, the motion of the objects will be harder to predict. Thus, a predicted video frame using color motion prediction will most likely have fewer artifacts than one predicted with only luma component motion prediction.

Figure 10:
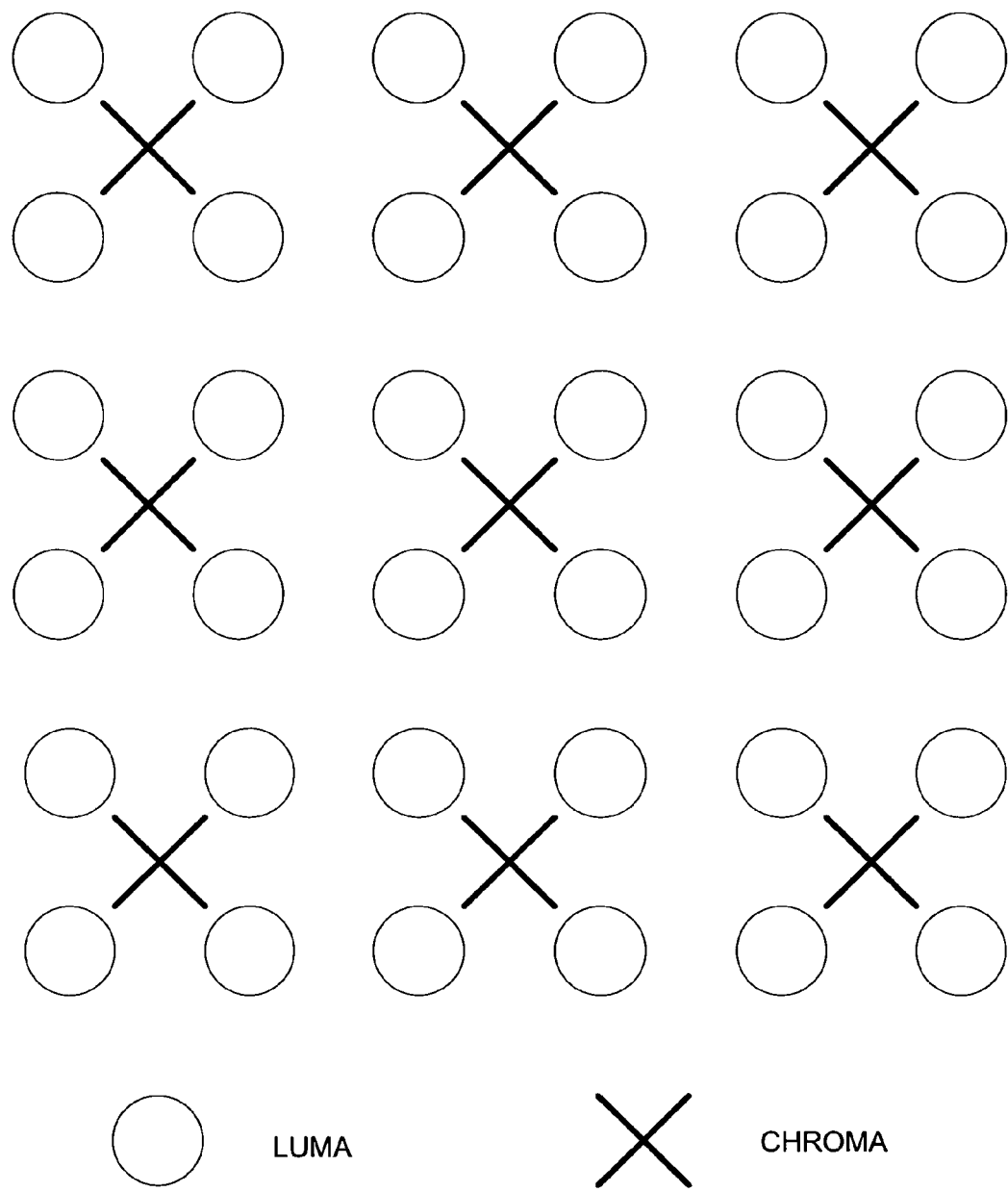
FIG. 10 illustrates the Luma and Chroma components in a color image.

As shown in FIG. 10, the chrominance components are half-sampled to the horizontal and vertical coordinate compared to the luminance component. If only frame coding is considered, the motion vector of the chrominance component is calculated as follow:

$$MV_{C\_}X = \frac{1}{2} * MV_{L\_}X$$

$$MV_{C\_}Y = \frac{1}{2} * MV_{L\_}Y$$

where ($MV_{L\_}X$, $MV_{L\_}Y$) is the luma motion vector and ($MV_{C\_}X$, $MV_{C\_}Y$) is the chroma motion vector. In one embodiment, the chroma motion vector is used to compute the sum of absolute differences (SAD) for the chroma motion vector that is incorporated into the motion vector prediction and RD optimization. The RD optimization equation for the luma-only is:

$$L = R + \lambda D$$

The motion prediction therefore can be viewed as minimizing this Lagrangian cost function. Here the distortion D represents the prediction error measured as SAD of the luminance component, R is the number of bits, the Langrangian multiplier is associated with the quantization parameter (QP) and its value controls the RD trade-off. Considering the chrominance components, the following cost finction is introduced:

$$L = R + \lambda (W_1 * D_L + W_2 * D_C) \ W_1 \epsilon(1,2), W_2 \epsilon(0,1)$$

in which $D_L$ and $D_C$ represent the distortion in the luma and chroma component respectively, $W_1$ and $W_2$ are experimental weighted parameters that are adaptive to specific video sequences. In one embodiment, because the chroma component has less information, its SAD calculation only uses the integer valued motion vector and therefore no interpolation is necessary.

4. Motion Vector Smoothing

Figure 11:
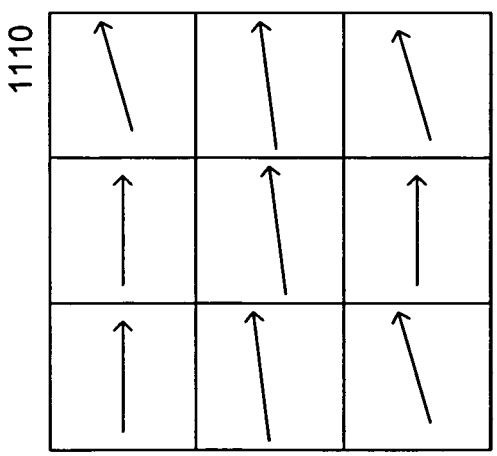
FIG. 11 illustrates three typical motion vector field arrangements after motion vector prediction; and, FIG. 12 is a block diagram of an access terminal and an access point of a wireless system.
Figure 11:
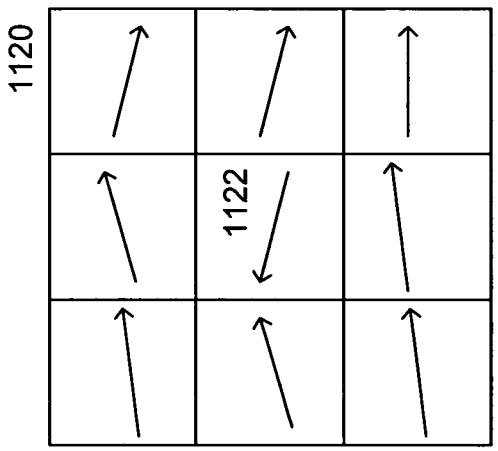
Figure 11:
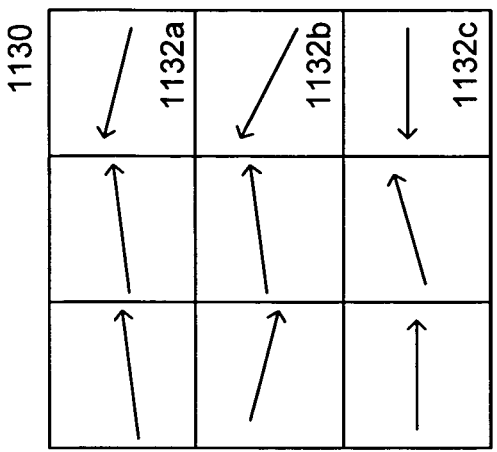

Any noise or lost frames that is encountered during the video capture and transmission of an encoded video sequence usually translates to a reduction in quality of the sequence during playback. In addition, the block matching motion vector prediction process also introduces errors in motion vector prediction. Vector median filtering (VMF) may be applied as another effective approach to improve motion vector prediction accuracy and reduce noise, while preserving video sequence details. The basic idea behind VMF is that neighboring motion vectors in natural video sequences are always correlated with each other. As illustrated in FIG. 11, three types of motion vector fields may appear after the motion vector prediction process, including a smooth region motion vector field 1110, an outlier motion vector 1122 in a motion vector field 1120, and a motion vector field 1130 showing an object edge defined by a plurality of motion vectors 1132(*a*)-(*c*) that have a direction opposite the direction of the other motion vectors in motion vector field 1130.

In one embodiment, a block size of 3×3 is selected to perform the median operation. Continuing to refer to FIG. 11, a "wrong" (or outlier) motion vector can be corrected in the outlier motion vector field 1120. However, VMF cannot be used when an object boundary occurs inside the block, such as in motion vector field 1130. In one embodiment, edge detection and object segmentation methods may be used to address this situation.

Each of the proposed motion vector prediction methods can be used independently or in combined. For example, in one embodiment, during transcoding the motion vector data available in the input video bitstream is extracted and saved for use in a target encoder, such as video codec 806. This data pertains to the incoming video frames. Motion vector data is remapped to the source frames input to the target encoder. In the process where a single reference frame is used, the motion vector data over previous N frames can be modeled to find the motion trajectory over these N frames. Motion vector smoothing can then be applied to remove outliers and improve the accuracy of the trajectory. Extrapolating the trajectory results in a more accurate estimate of the motion vector for the block to be encoded. In addition, the motion vector data extracted from the input video bitstream may or may not be the true motion vectors. The accuracy of these motion vectors typically depends on the motion search algorithm used in the upstream source encoder. Deriving the motion field of each decoded frame based on these motion vectors and applying a suitable motion vector smoothing technique will help eliminate outliers. When the accuracy of a motion vector cannot be ascertained, other methods, such as those based on motion vectors of spatial neighbors or collocated neighbors, can be adopted.

If sufficient information is available to enable more than one of the proposed methods, the following prioritizations in deriving the motion vector estimation are proposed:
 1. Rank the accuracy of each method (e.g., using a range from 0-1) based on the. additional information available from metadata or pre-processing finctions. For example, if de-interlacing or inverse telecine was used as part of pre-processing, the motion vector data needs to be mapped appropriately. If the result of motion vector smoothing is ambiguous, the accuracy of this method is poor. If extracted motion vector, motion vector smoothed motion vector and pre-processed and remapped motion vector are close, the accuracy of this estimate of motion vector is high. Further, for chroma motion estimation, the accuracy depends on the proportion of chroma information relative to the luma information in the source content. When possible, non-causal and causal motion vectors from all reference frames are to be used.
 2. Apply weights to each method based on its rank.
 3. Apply a non-linear selection algorithm to select the method.

The above-described additions to a video codec attempts to improve the accuracy of the motion vector prediction process. Although computation is involved in the implementation of each method, the improvement of the accuracy of the motion vector prediction will reduce computation in the pixel search step, SAD calculation and RD optimization. Thus, the total encoding time will be reduced and better video quality will be achieved.

Figure 12:
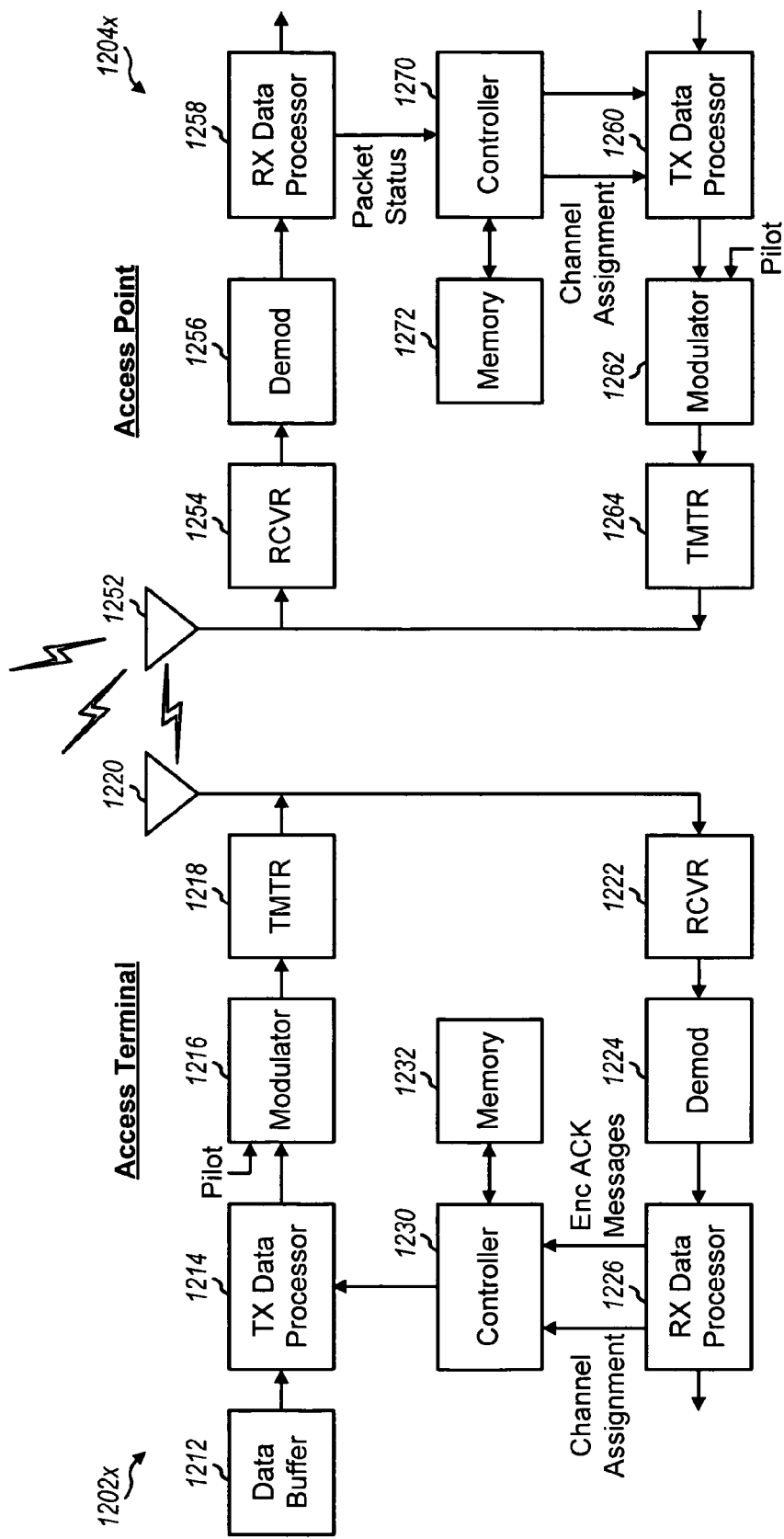

FIG. 12 shows a block diagram of an access terminal 1202*x* and an access point 1204*x* in a wireless system, each of which may implement the motion vector prediction process described herein. An "access terminal," as discussed herein, refers to a device providing voice and/or data connectivity to a user. The access terminal may be connected to a computing device such as a laptop computer or desktop computer, or it may be a self contained device such as a personal digital assistant. The access terminal can also be referred to as a subscriber unit, mobile station, mobile, remote station, remote terminal, user terminal, user agent, or user equipment. The access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem. An "access point," as discussed herein, refers to a device in an access network that communicates over the air-interface, through one or more sectors, with the access terminals. The access point acts as a router between the access terminal and the rest of the access network, which may include an IP network, by converting received air-interface frames to IP packets. The access point also coordinates the management of attributes for the air interface.

For the reverse link, at access terminal 1202*x*, a transmit (TX) data processor 1214 receives traffic data from a data buffer 1212, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 1216 receives the data symbols, pilot symbols, and possibly signaling for the reverse link, performs (e.g., OFDM) modulation and/or other processing as specified by the system, and provides a stream of output chips. A transmitter unit (TMTR) 1218 processes (e.g., converts to analog, filters, amplifies, and frequency upconverts) the output chip stream and generates a modulated signal, which is transmitted from an antenna 1220.

At access point 1204*x*, the modulated signals transmitted by access terminal 1202*x* and other terminals in communication with access point 1204*x* are received by an antenna 1252. A receiver unit (RCVR) 1254 processes (e.g., conditions and digitizes) the received signal from antenna 1252 and provides received samples. A demodulator (Demod) 1256 processes (e.g., demodulates and detects) the received samples and provides detected data symbols, which are noisy estimate of the data symbols transmitted by the terminals to access point 1204*x*. A receive (RX) data processor 1258 processes (e.g., symbol demaps, deinterleaves, and decodes) the detected data symbols for each terminal and provides decoded data for that terminal.

For the forward link, at access point 1204*x*, traffic data is processed by a TX data processor 1260 to generate data symbols. A modulator 1262 receives the data symbols, pilot symbols, and signaling for the forward link, performs (e.g., OFDM) modulation and/or other pertinent processing, and provides an output chip stream, which is further conditioned by a transmitter unit 1264 and transmitted from antenna 1252. The forward link signaling may include power control commands generated by a controller 1270 for all terminals transmitting on the reverse link to access point 1204*x*. At access terminal 1202*x*, the modulated signal transmitted by access point 1204*x* is received by antenna 1220, conditioned and digitized by a receiver unit 1222, and processed by a demodulator 1224 to obtain detected data symbols. An RX data processor 1226 processes the detected data symbols and provides decoded data for the terminal and the forward link signaling. Controller 1230 receives the power control commands, and controls data transmission and transmit power on the reverse link to access point 1204*x*. Controllers 1230 and 1270 direct the operation of access terminal 1202*x* and access point 1204*x*, respectively. Memory units 1232 and 1272 store program codes and data used by controllers 1230 and 1270, respectively.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities. In addition, hardware such as a GPS receiver may be incorporated as necessary in the client to implement the various embodiments described herein. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, e.g., in an instant messaging service or any general wireless data communication applications, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments. Accordingly, the invention is to be defined solely by the scope of the following claims.

What is claimed is:

1. A method for motion vector prediction for one area in a video frame, the video frame including a plurality of areas, the method comprising:
    generating a candidate motion vector for another area of the plurality of areas in the video frame, the another area being adjacent to the one area in the video frame and lacking an associated motion vector; and
    using the candidate motion vector to predict a current motion vector for the one area in the video frame, wherein generating the candidate motion vector for the another area of the plurality of areas in the video frame comprises:
        performing motion vector processing using at least two motion vector processing techniques selected from a group comprising chrominance and luminance detection, motion vector smoothing, and motion vector predicting with metadata from a previous format;
        performing a ranking of each of the at least two motion vector processing techniques based on an accuracy associated with each of the at least two motion vector processing techniques;
        applying weights to each of the at least two motion vector processing techniques based at least in part on the ranking; and
        applying a non-linear selection algorithm to select at least one of the weighted at least two motion vector processing techniques for generating the candidate motion vector.

2. The method of claim 1, wherein the group further comprises motion estimation comprising:
    downsampling the video frame to create a lower resolution video frame;
    creating a set of motion vectors from the lower resolution video frame; and,
    mapping each motion vector from the set of motion vectors to the one area in the plurality of areas in the video frame.

3. The method of claim 2, wherein the lower resolution video frame includes a set of blocks and creating the set of motion vectors from the lower resolution video frame comprises performing motion estimation of the set of blocks of the lower resolution video frame to create a set of coarse motion vectors.

4. The method of claim 1, wherein performing motion vector processing using chrominance and luminance detection comprises:
    deriving a chroma motion vector;
    computing a sum of absolute differences (SAD) value for the chroma motion vector; and,
    incorporating the SAD value for the chroma motion vector in the motion vector processing.

5. The method of claim 1, wherein performing motion vector processing using motion vector predicting with metadata from a previous format comprises:
    receiving an encoded video stream encoded using a first codec;
    decoding the encoded video stream to extract at least one first motion vector associated with the another area in the plurality of areas in the video frame lacking the associated motion vector; and,
    encoding the decoded video stream into a second encoded video stream using a second codec and using the at least one first motion vector as the candidate motion vector in the second encoded video stream.

6. The method of claim 1, wherein performing motion vector processing using motion vector smoothing comprises:
    creating a motion vector field comprising a plurality of motion vectors;
    determining if a motion vector in the plurality of motion vectors is an outlier motion vector by comparing the motion vector with its neighboring motion vectors; and,
    removing the outlier motion vector.

7. A non-transitory computer readable medium having instructions stored thereon for causing at least one computer to execute a method for motion vector prediction for a current block in a video frame, the current block having a set of neighboring blocks in the video frame that includes blocks that do not have an associated motion vector, the instructions comprising:
    code for causing the at least one computer to derive a candidate motion vector for each block in the set of neighboring blocks; and,
    code for causing the at least one computer to use the candidate motion vector for each block in the set of neighboring blocks to predict a current motion vector for the current block, wherein the code for causing the at least one computer to derive the candidate motion vector for each block in the set of neighboring blocks comprises:
        code for causing the at least one computer to perform motion vector processing using at least two motion vector processing techniques selected from a group including chrominance and luminance detection, motion vector smoothing, and motion vector predicting with metadata from a previous format;
        code for causing the at least one computer to perform a ranking of the used at least two motion vector processing techniques based on an accuracy associated with each of the at least two motion vector processing techniques;
        code for causing the at least one computer to apply weights to the used at least two motion vector processing techniques based at least in part on the ranking; and
        code for causing the at least one computer to apply a non-linear selection algorithm to select at least one of the weighted at least two motion vector processing techniques for deriving the candidate motion vector.

8. The computer readable medium of claim 7, wherein the group further comprises motion estimation and the code for causing the at least one computer to perform motion vector processing using motion estimation comprises:
- code for causing the at least one computer to downsample the video frame to create a lower resolution video frame;
- code for causing the at least one computer to create a set of motion vectors from the lower resolution video frame; and,
- code for causing the at least one computer to map each motion vector from the set of motion vectors to at least one area in the video frame.

9. The computer readable medium of claim 8, wherein the lower resolution video frame includes a set of blocks and the code for causing the at least one computer to create the set of motion vectors from the lower resolution video frame comprises code for causing the at least one computer to perform motion estimation of the set of blocks of the lower resolution video frame to create a set of coarse motion vectors.

10. The computer readable medium of claim 7, wherein the code for causing the at least one computer to perform motion vector processing using chrominance and luminance detection comprises:
- code for causing the at least one computer to derive a chroma motion vector;
- code for causing the at least one computer to compute a sum of absolute differences (SAD) value for the chroma motion vector; and,
- code for causing the at least one computer to incorporate the SAD value for the chroma motion vector in the motion vector processing.

11. The computer readable medium of claim 7, wherein the code for causing the at least one computer to perform motion vector processing using motion vector predicting with metadata from a previous format comprises:
- code for causing the at least one computer to receive an encoded video stream encoded using a first codec;
- code for causing the at least one computer to decode the encoded video stream to extract at least one first motion vector associated with at least one block of the set of neighboring blocks; and,
- code for causing the at least one computer to encode the decoded video stream into a second encoded video stream using a second codec and using the at least one first motion vector as the candidate motion vector in the second encoded video stream.

12. The computer readable medium of claim 7, wherein the code for causing the at least one computer to perform motion vector processing using motion vector smoothing comprises:
- code for causing the at least one computer to create a motion vector field comprising a plurality of motion vectors;
- code for causing the at least one computer to determine if a motion vector in the plurality of motion vectors is an outlier motion vector by comparing the motion vector with its neighboring motion vectors; and,
- code for causing the at least one computer to remove the outlier motion vector.

13. An apparatus for predicting a motion vector for a current block in a video frame, the current block having a set of neighboring blocks in the video frame that includes blocks that do not have an associated motion vector, the apparatus comprising:
- means for deriving a candidate motion vector for each block in the set of neighboring blocks; and,
- means for using the candidate motion vector for each block in the set of neighboring blocks to predict a current motion vector for the current block, wherein the means for deriving the candidate motion vector for each block in the set of neighboring blocks comprises:
  - means for performing motion vector processing using at least two motion vector processing techniques selected from a group comprising chrominance and luminance detection, motion vector smoothing, and motion vector predicting with metadata from a previous format;
  - means for performing a ranking of the used at least two motion vector processing techniques based on an accuracy associated with each of the at least two motion vector processing techniques;
  - means for applying weights to the used at least two motion vector processing techniques based at least in part on the ranking; and
  - means for applying a non-linear selection algorithm to select at least one of the weighted at least two motion vector processing techniques for deriving the candidate motion vector.

14. The apparatus of claim 13, wherein the group further comprises motion estimation and the means for performing motion vector processing using motion estimation comprises:
- means for downsampling the video frame to create a lower resolution video frame;
- means for creating a set of motion vectors from the lower resolution video frame; and,
- means for mapping each motion vector from the set of motion vectors to at least one area in the video frame.

15. The apparatus of claim 14, wherein the lower resolution video frame includes a set of blocks and the means for creating the set of motion vectors from the lower resolution video frame comprises means for performing motion estimation of the set of blocks of the lower resolution video frame to create a set of coarse motion vectors.

16. The apparatus of claim 13, wherein the means for performing motion vector processing using chrominance and luminance detection comprises:
- means for deriving a chroma motion vector;
- means for computing a sum of absolute differences (SAD) value for the chroma motion vector; and,
- means for incorporating the SAD value for the chroma motion vector in the motion vector processing.

17. The apparatus of claim 13, wherein the means for performing motion vector processing using motion vector predicting with metadata from a previous format comprises:
- means for receiving an encoded video stream encoded using a first codec;
- means for decoding the encoded video stream to extract at least one first motion vector associated with at least one block of the set of neighboring blocks; and,
- means for encoding the decoded video stream into a second encoded video stream using a second codec and using the at least one first motion vector as the candidate motion vector in the second encoded video stream.

18. The apparatus of claim 13, wherein the means for performing motion vector processing using motion vector smoothing comprises:
- means for creating a motion vector field comprising a plurality of motion vectors;
- means for determining if a motion vector in the plurality of motion vectors is an outlier motion vector by comparing the motion vector with its neighboring motion vectors; and,
- means for removing the outlier motion vector.

19. At least one processor including one or more configurable logic modules, the one or more modules configured to implement a method for motion vector prediction for one area in a video frame, the video frame including block having a plurality of areas, the one or more modules comprising:

a module configured to generate a candidate motion vector for another area of the plurality of areas in the video frame, the another area being adjacent to the one area in the video frame and lacking an associated motion vector; and, a module configured to use the candidate motion vector to predict a current motion vector for the one area in the video frame, wherein the module configured to generate the candidate motion vector for the another area of the plurality of areas in the video frame comprises:

a module configured to perform motion vector processing using at least two motion vector processing techniques selected from a group comprising chrominance and luminance detection, motion vector smoothing, and motion vector predicting with metadata from a previous format;

a module configured to perform a ranking of the used at least two motion vector processing techniques based on an accuracy associated with each of the at least two motion vector processing techniques;

a module configured to apply weights to the used at least two motion vector processing techniques based at least in part on the ranking; and a module configured to apply a non-linear selection algorithm to select at least one of the weighted at least two motion vector processing techniques for generating the candidate motion vector.

20. The at least one processor of claim 19, wherein the group further comprises motion estimation and the module configured to perform motion vector processing using motion estimation comprises:

a module configured to downsample the video frame to create a lower resolution video frame;

a module configured to create a set of motion vectors from the lower resolution video frame; and, a module configured to map each motion vector from the set of motion vectors to the one area in the plurality of areas in the video frame.

21. The at least one processor of claim 20, wherein the lower resolution video frame includes a set of blocks and the module configured to create the set of motion vectors from the lower resolution video frame comprises a module configured to perform motion estimation of the set of blocks of the lower resolution video frame to create a set of coarse motion vectors.

22. The at least one processor of claim 19, wherein the module configured to perform motion vector processing using chrominance and luminance detection comprises:

a module configured to derive a chroma motion vector;

a module configured to compute a sum of absolute differences (SAD) value for the chroma motion vector; and, a module configured to incorporate the SAD value for the chroma motion vector in the motion vector processing.

23. The at least one processor of claim 19, wherein the module configured to perform motion vector processing using motion vector predicting with metadata from a previous format comprises:

a module configured to receive an encoded video stream encoded using a first codec;

a module configured to decode the encoded video stream to extract at least one first motion vector associated with the another area in the plurality of areas in the video frame lacking the associated motion vector; and, a module configured to encode the decoded video stream into a second encoded video stream using a second codec and using the at least one first motion vector as the candidate motion vector in the second encoded video stream.

24. The at least one processor of claim 19, wherein the module configured to perform motion vector processing using motion vector smoothing comprises:

a module configured to create a motion vector field comprising a plurality of motion vectors;

a module configured to determine if a motion vector in the plurality of motion vectors is an outlier motion vector by comparing the motion vector with its neighboring motion vectors; and, a module configured to remove the outlier motion vector.

\* \* \* \* \*